(12) United States Patent
Salokatve

(10) Patent No.: US 7,991,255 B2
(45) Date of Patent: Aug. 2, 2011

(54) MEANS OF COUPLING LIGHT INTO OPTICAL FIBERS AND METHODS OF MANUFACTURING A COUPLER

(75) Inventor: Arto Salokatve, Tampere (FI)

(73) Assignee: Corelase Oy, Tampere (FI)

( * ) Notice: Subject to any disclaimer, the term of this patent is extended or adjusted under 35 U.S.C. 154(b) by 73 days.

(21) Appl. No.: 12/172,099

(22) Filed: Jul. 11, 2008

(65) Prior Publication Data

US 2009/0154879 A1   Jun. 18, 2009

Related U.S. Application Data

(63) Continuation of application No. PCT/FI2007/050690, filed on Dec. 14, 2007.

(51) Int. Cl.
*G02B 6/26* (2006.01)
*C03B 37/15* (2006.01)

(52) U.S. Cl. ............... 385/43; 385/31; 385/96; 385/127; 65/407; 65/408; 359/341.3; 264/1.25

(58) Field of Classification Search ............. 385/31, 385/39, 43, 40, 42, 95–99, 126–127; 359/341.1, 359/341.3; 65/385, 406, 407, 408; 264/1.25; 372/6
See application file for complete search history.

(56) References Cited

U.S. PATENT DOCUMENTS

| | | | |
|---|---|---|---|
| 5,412,745 A | 5/1995 | Weidman et al. | |
| 5,664,037 A | 9/1997 | Weidman | |
| 5,854,865 A | 12/1998 | Goldberg | |
| 5,864,644 A | 1/1999 | DiGiovanni et al. | |
| 5,999,673 A | 12/1999 | Valentin et al. | |
| 6,088,494 A | 7/2000 | Keck et al. | |
| 6,301,412 B1 | 10/2001 | Mori et al. | |

(Continued)

FOREIGN PATENT DOCUMENTS

JP          2007156097          6/2007

(Continued)

OTHER PUBLICATIONS

Kosterin A et al: "Tapered fiber bundles for high power applications;" Optical Fiber Communication Conference, 2005. Technical Digest. OFC/NFOEC Anaheim, CA, USA, Mar. 6-11, 2005, Piscataway, NJ, USA, IEEE, vol. 2, Mar. 6, 2005, pp. 146-148, XP010831431.

(Continued)

*Primary Examiner* — Brian M. Healy
*Assistant Examiner* — Michael P Mooney
(74) *Attorney, Agent, or Firm* — McDonnell Boehnen Hulbert & Berghoff LLP

(57) ABSTRACT

The invention relates to a pump coupler (2) and a manufacturing method. The pump coupler (2) comprises a least one signal fiber (50) for outputting optical energy, multiple pump fibers (31) for inputting optical energy into the signal fiber (50), and a coupling structure (40) for coupling the optical energy of the pump fibers (31) into the signal fiber (50). A signal feed-through fiber (32) goes through the coupling structure (40). In accordance with the invention the coupling structure (40) is a tapering capillary tube (40) having a first wide end (65) and a second narrow end (70), the pump fibers (31) are connected to the wide end of the capillary tube (40), and at least the narrow end (70) of the capillary tube (70) is collapsed around the signal fiber (32).

22 Claims, 8 Drawing Sheets

U.S. PATENT DOCUMENTS

| | | |
|---|---|---|
| 6,529,657 B2 | 3/2003 | Goldberg et al. |
| RE38,586 E | 9/2004 | Weidman |
| 7,272,956 B1 * | 9/2007 | Anikitchev et al. ............. 65/409 |
| 7,532,792 B2 | 5/2009 | Skovgaard et al. |
| 7,539,377 B2 | 5/2009 | Gonthier |
| 2005/0105854 A1 | 5/2005 | Dong et al. |
| 2005/0105866 A1 | 5/2005 | Grudinin et al. |
| 2006/0251367 A1 | 11/2006 | Seifert et al. |
| 2008/0050069 A1 | 2/2008 | Skovgaard |
| 2008/0209952 A1 | 9/2008 | Tremblay |
| 2009/0148098 A1 * | 6/2009 | Lewis et al. .................... 385/31 |
| 2009/0202204 A1 | 8/2009 | Nielsen |

FOREIGN PATENT DOCUMENTS

| | | |
|---|---|---|
| WO | 2007090272 A1 | 8/2007 |
| WO | 2007107163 A1 | 9/2007 |
| WO | 2007148139 A1 | 12/2007 |
| WO | 2008083482 A1 | 7/2008 |

OTHER PUBLICATIONS

Commonly owned U.S. Appl. No. 12/206,577, filed Jul. 8, 2008.
European Search Report, European patent application No. 08 17 1604.

* cited by examiner

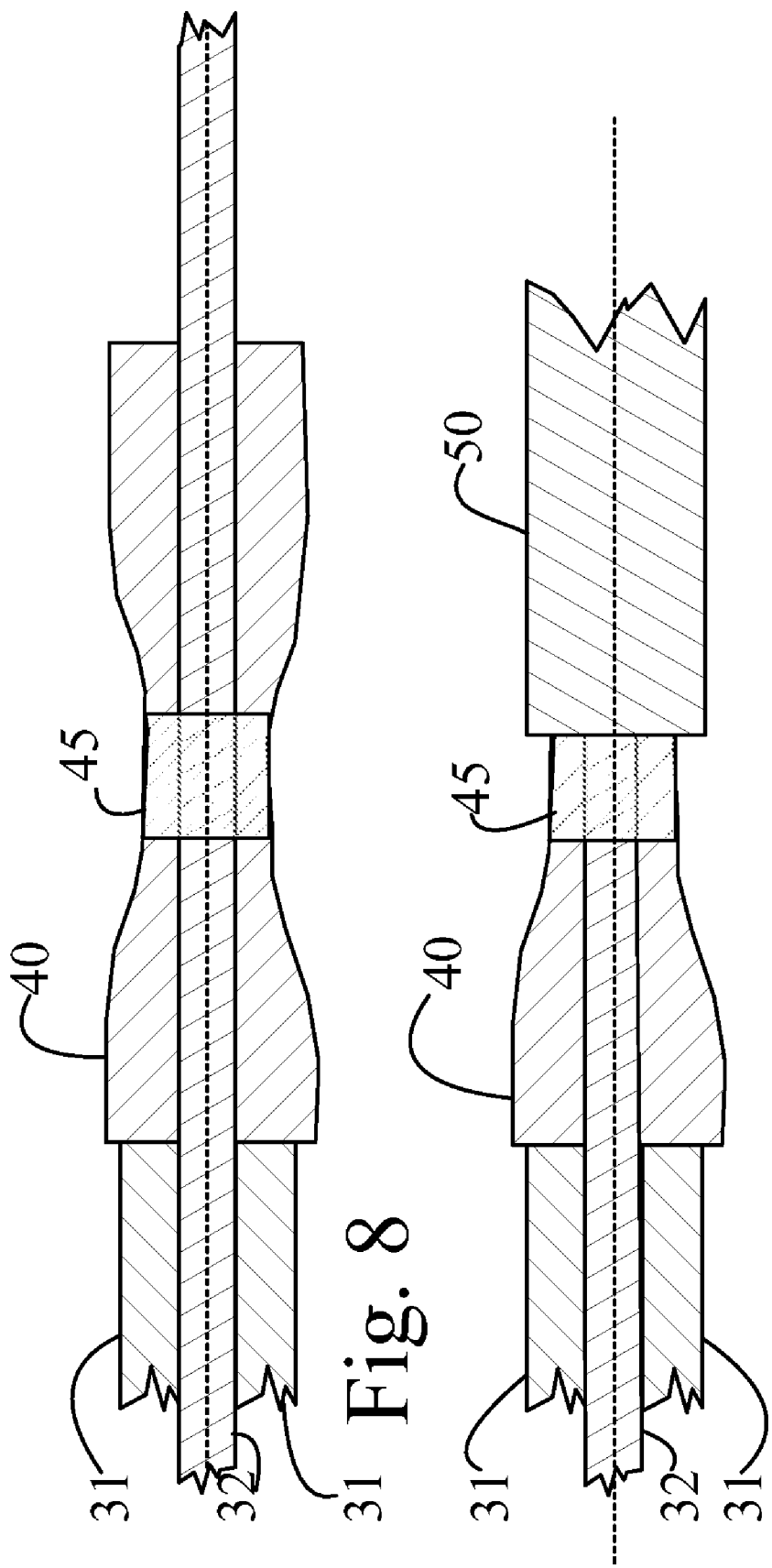

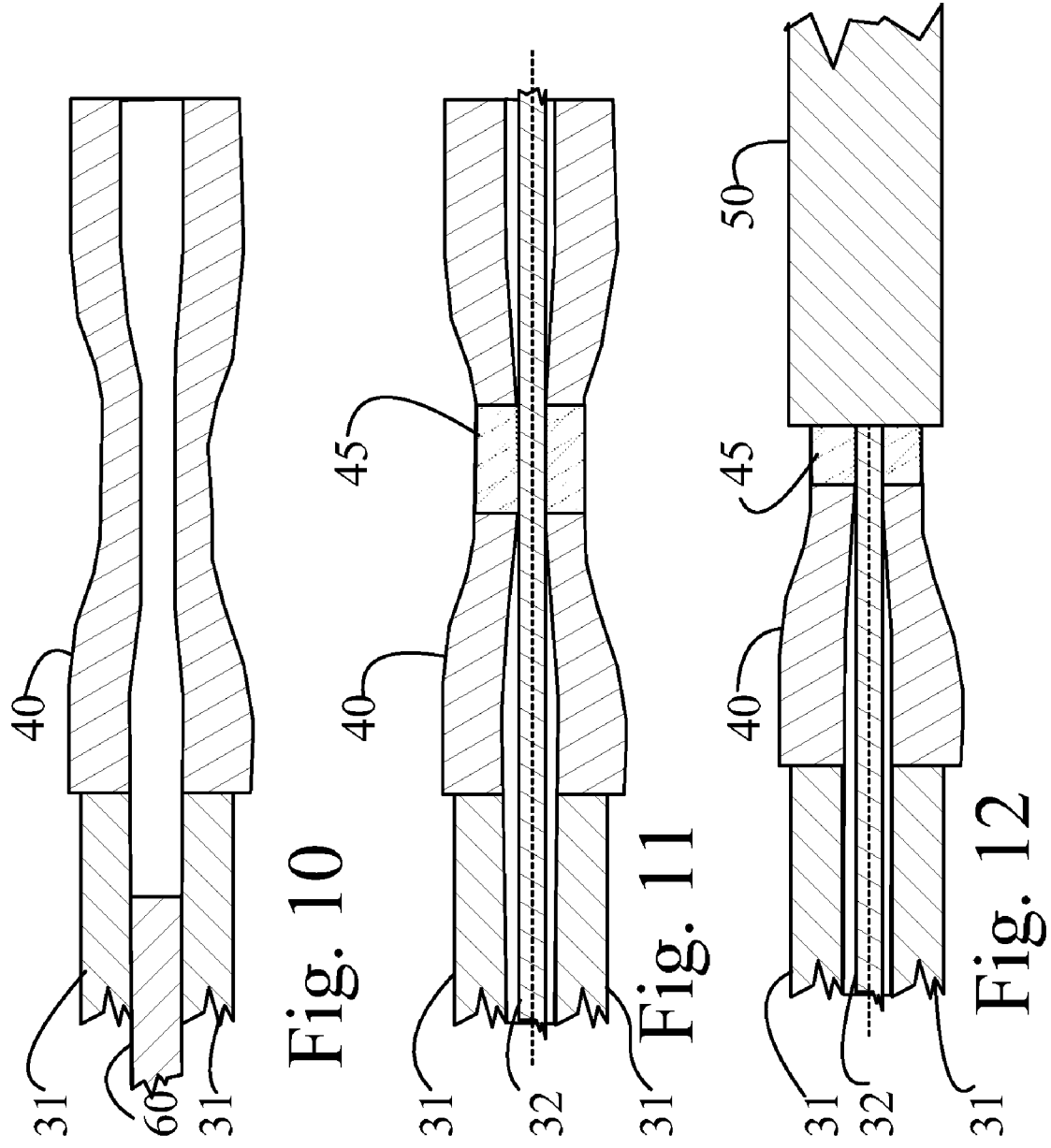

MEANS OF COUPLING LIGHT INTO OPTICAL FIBERS AND METHODS OF MANUFACTURING A COUPLER

CROSS-REFERENCE TO RELATED APPLICATION

The present application is a continuation of International Application No. PCT/FI2007/050690, filed Dec. 14, 2007 and entitled "Means of Coupling Light Into Optical Fibers and Methods of Manufacturing a Coupler." The foregoing application is incorporated herein by reference.

The present invention relates to an optical coupler in accordance with the preamble of claim 1.

The present invention relates also to a method for manufacturing an optical coupler.

Fiber lasers have many attractive properties that make them suitable for various industrial applications. Such properties include good beam quality, easy thermal management, compact size, and good efficiency. Therefore, fiber lasers are continuing to gain market share from more conventional types of lasers, such as solid-state and gas lasers. Fiber lasers are able to produce optical output in the several kW range with excellent beam quality. Thus, these lasers can be used for macro-machining applications like welding and cutting of metal. Furthermore, fiber lasers lend themselves for operation with ultra-short pulses by a method of mode-locking, enabling them to be used in micro-machining applications as well.

In the following discussion it is assumed that the reader has some basic knowledge of the structure of optical fibers. Thus, the concepts of a fiber core, cladding, and coating are not discussed in detail. It suffices here to mention that the laser radiation generated in a fiber laser, here referred to as the signal, is propagating in the core of the fiber, whose diameter is typically between few microns and few tens of microns. A so called double-clad fiber consists of a core, a primary cladding that confines the signal light to the core and guides the pump light, and the secondary cladding that confines the pump light into the primary cladding. The core is typically made of doped fused silica, the primary cladding of fused silica, and the secondary cladding of low-index polymer or doped fused silica. The meaning of pump light is discussed later.

For later reference some further terms or concepts related to fiber processing are also briefly discussed here. Splicing is a well-known term in the art of fiber optics. It refers to joining at least two glass parts together by heating the parts close to the joint to a high temperature to make the glass soft, and then pushing the parts into physical contact with each other. Hence, an intimate and transparent contact is formed between the parts. The heat source for splicing can be an electric arc, a hot filament or a $CO_2$ laser, for instance. Cleaving means cutting a glass part so as to form a flat surface to it. In optical fibers, the cleave plane usually lies essentially perpendicular to the optical axis of the fiber (perpendicular cleave). It may also be essentially non-perpendicular (angle-cleave). Unless otherwise stated, in this document cleaving means producing a perpendicular cleave. An equivalent, although more laborious, means of getting a flat plane to the fiber tip is the well-known method of mechanical polishing. Cleaving can be done by mechanical means by scratching the fiber with a sharp blade made of hard material and applying tension to the fiber to break it, or by a laser. A good cleave for optical fibers makes high quality splicing possible. Stripping means removing the polymer coating from the fiber, usually in a distance of a few centimeters from its end. Collapsing in this document refers to heating a hollow piece of glass, such as a capillary tube, in order to make it soft and to make it shrink by surface tension forces and/or by differential pressure between the inside and outside region of the piece. Heating can be done with the same methods as in splicing.

As any laser, a fiber laser consists of a gain medium, an optical resonator, means of coupling energy into the gain medium, and means of extracting light out of the optical resonator. The gain medium in a fiber laser consists of a length of an optical fiber, the active fiber, generally made of fused silica, the core of which is doped with optically active atoms such as rare-earth atoms Er or Yb. The optical resonator is formed by surrounding the gain medium with mirrors that, when properly aligned with respect to the active fiber, force some of the light emitted by the active atoms to bounce between the mirrors through the gain medium and get amplified. The mirrors can be either bulk optical mirrors, or they can be directly fabricated into optical fibers. In the latter case they are usually fiber Bragg gratings (FBGs), but other fiber-based mirrors exist also. Fiber-based mirrors are attractive since they can be directly attached or spliced to other fibers with very low optical losses. The mirrors, or typically only one of the two mirrors, are made only partially reflective to provide a means of extracting light out of the optical resonator. In fiber lasers, the extracted light can be further guided with a length of optical fiber close to the point of interest, such as the work-piece. The extracted light thus forms the beam of laser light that can be used in the final application.

The gain medium, i.e. active fiber in a fiber laser, is an electric insulator. Thus, energy cannot be supplied to it directly in the form of electric power. However, the active atoms absorb optical radiation within certain wavelength ranges called the absorption bands. This property is utilized in fiber lasers by feeding or 'pumping' the energy into the gain medium in the form of light. This light is called the pump light, and is usually generated by pump diode lasers, which preferably are fiber coupled. Thus, in a fiber laser there must exist a means of coupling the said pump light into the active fiber. It is further desirable, that the coupling means has low optical losses, i.e. almost all of the pump energy can be coupled into the gain medium. It is further desirable that the coupling means has a signal feed-through where the laser signal can pass through it with low optical losses. The latter property greatly helps in the laser cavity construction, and is a favored prerequisite for industrial class fiber lasers.

THE PRIOR ART

There are a number of ways making a pump coupler using free-space optics, such as those shown in U.S. Pat. No. 5,854,865, U.S. Pat. No. 6,529,657 and JP2007156097. These approaches differ fundamentally from the present invention, which is a fused all-glass coupler. Therefore, the following discussion is concentrating on prior art having fused all-glass implementations.

In U.S. Pat. No. 5,864,644 the input fibers, which may include a signal fiber, are simply bundled together and tapered to fuse the fibers together. Then the fused bundle is cleaved from the waist and spliced to an output fiber. This approach also involves tapering of both the pump fibers and the signal fiber. The core diameter of the signal fiber is reduced in the process. Furthermore, the output fiber needs to have the same reduced diameter of the core for low splicing losses. Hence, this coupler unavoidably has different core diameters at the input and at the output.

In U.S. Pat. No. 5,999,673 the coupler is made by tapering the pump fibers, and fusing them to the signal-carrying central fiber from the tapered portion allowing the pump light thus to be coupled to the signal fiber. Since the pump fibers cannot be tapered to zero thickness, some loss of pump light is expected in this approach. Furthermore, fusing multiple pump fibers directly to the signal fiber along extended length of it has a risk of bending the signal fiber and causing microbending losses to the signal light. Each of the pump fibers need also be tapered to a very small thickness which is a tedious process for structures involving multiple pump fibers.

US2005105866 describes a coupler, where the pump fibers are essentially in optical contact with the active fiber along the longitudinal axis of the fibers. In this implementation, the pump fibers need to be manufactured in the same fiber drawing process as the active fiber in order to make and maintain optical contact between them by e.g. coating the whole structure with a polymer coating or by fusing them along their longitudinal axis. Furthermore, this approach requires the signal fiber to be an active fiber, since efficient coupling of power can be achieved only when the core of the signal fiber is absorbing the pump radiation along the length of the signal fiber. This approach preserves well the beam quality of the signal, but has limited scalability in pump power, practically requires the signal fiber to be an active fiber and requires complicated methods to attain optical contact between pump and signal fibers.

In US2005105854 a bundle of pump fibers is formed around a central fiber, and they are first fused together. The bundle is then spliced to an output fiber. Performing such a splice is very challenging, since it requires careful alignment of the core of the signal fiber with that of the output fiber and also making a good contact of all pump fibers to the output fiber.

US2006251367 describes an optical fiber coupler with at least a first input optical fiber and at least one output optical fiber, said first input optical fibers comprising an antiguiding core. This patent is very vague in not actually describing in detail the structure of the actual coupling region, which is the essential property of any coupler. Only in claim 9 it is mentioned that the coupling region is a tapered bundle of fibers, thus fundamentally differing from that of the present invention. Thus, this patent is of questionable usefulness, and it cannot be used as a basis for actually constructing such a coupler since no detailed description of the coupling region is given. Furthermore, it is limited to antiguiding input fibers.

WO2007090272 describes a multimode fiber coupler that has a structure in which multiple tapered pump fibers are coupled laterally to a multi-clad signal fiber. In the fusing process the bundle of tapered pump fibers and central fiber are twisted, heated and drawn to form a further taper with a waist in the bundle. The fused bundle is then cleaved from the waist and spliced to another multi-clad fiber. The drawback of this approach of making a coupler is that each of the pump fibers needs to be tapered separately. Furthermore, in the formation of the twisted and fused bundle the central signal carrying fiber is also deformed and tapered, in particular in its core dimensions. This is not desirable for couplers used in high power fiber lasers due to inevitable incurred losses for the signal power, due to impaired modal quality for the signal light and due to risks of reaching the damage threshold for core material.

This invention describes a practical means of coupling pump light into an optical fiber and a method of manufacturing it. From here onwards, the term pump coupler is used for the coupling means. The coupler of this invention does not have tapers on any of the pump fibers nor the signal fiber but the coupling is performed with aid of a tapering capillary tube, to which the pump fibers and the signal fiber are coupled.

More specifically, the apparatus in accordance with invention is characterized by what is stated in the characterizing portion of claim 1.

More specifically, the method in accordance with invention is characterized by what is stated in the characterizing portion of claim 5.

The following benefits may be obtained by the invention.

In this invention the pump coupler has the property of having a low-loss signal feed-through for the laser radiation generated by the fiber laser. Furthermore, the signal feed-through made by the procedures of this invention produces minimal degradation of the beam quality for the laser radiation traversing through it. Finally, with the coupler structure of this invention it is possible to achieve very high pump coupling efficiencies to the output fiber.

DETAILED DESCRIPTION OF THE INVENTION

FIG. 5b shows cross section A of FIG. 5a.

FIG. 8 shows as a side view a structure of FIGS. 6 and 7 in a next phase of the method in accordance with the invention.

FIG. 9 shows as a side view a structure of FIGS. 6, 7 and 8 in a next phase of the method in accordance with the invention.

FIG. 10 shows as a side view a pump coupler preliminary structure relating to a method step of a method in accordance with the invention.

FIG. 11 shows as a side view a structure of FIG. 10 in a next phase of the method in accordance with the invention.

FIG. 12 shows as a side view a structure of FIGS. 10 and 11 in a next phase of the method in accordance with the invention.

Figure 1:
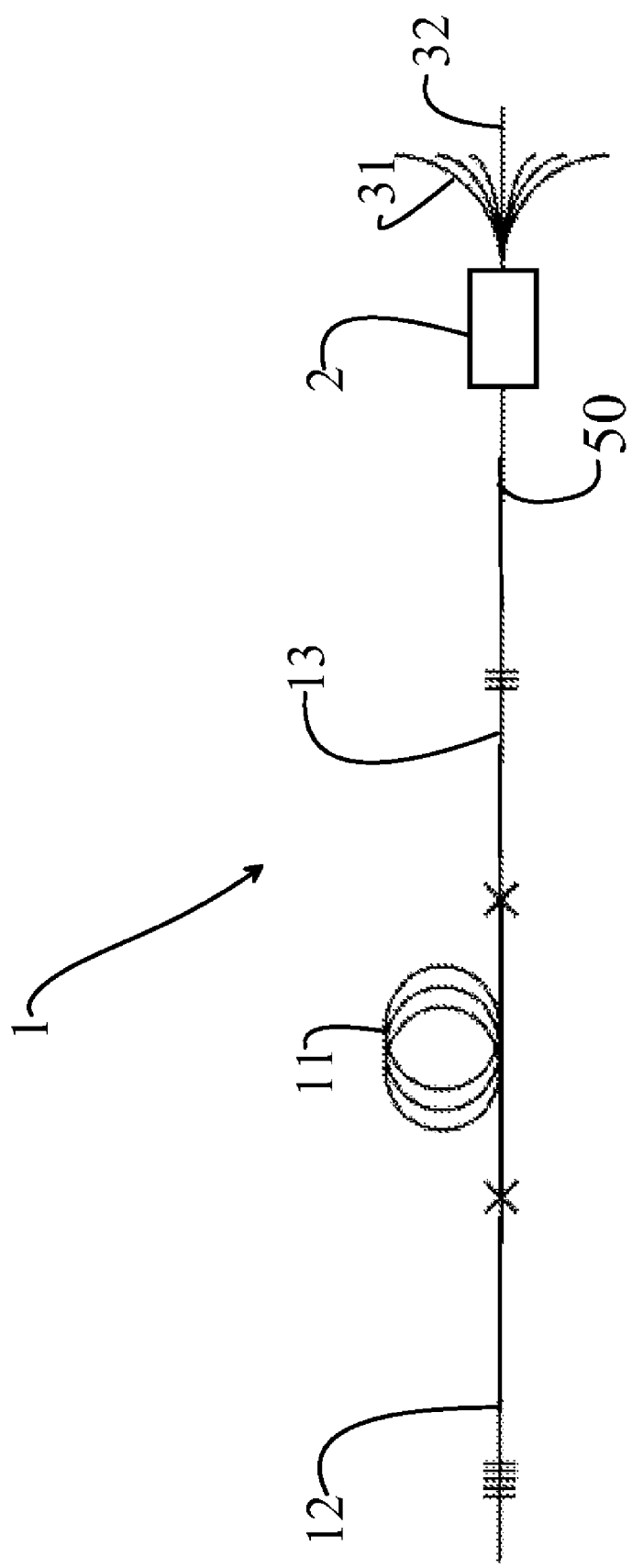
FIG. 1 shows schematically one example of a fiber laser, which can be used in connection with the invention.

FIG. 1 describes one example of a configuration of a fiber laser. It consists of a fiber-based laser resonator 1, which is composed of an active fiber 11, a high-reflective (HR) FBG mirror 12 and a low-reflective (LR) FBG mirror 13. The LR FBG 13 furthermore provides a means of extracting laser radiation out of the laser resonator 1 by having an optical reflectivity significantly smaller than 100%. Typical reflectivities for HR and LR FBGs are >90% and 10%, respectively. FIG. 1 also depicts a pump coupler 2, which interfaces to the pump sources via the pump fibers 31 and to exterior world and the fiber laser resonator via the signal feed-through fiber 32 and output signal fiber 50, respectively. The fiber laser cavity of FIG. 1 has a so-called counter-pumped configuration where the pump light and the output signal light are counter-propagating. Furthermore, in the example of FIG. 1 the pump coupler 2 lies outside the laser resonator 1. The cross marks in FIG. 1 denote splices between different fibers.

Figure 2:
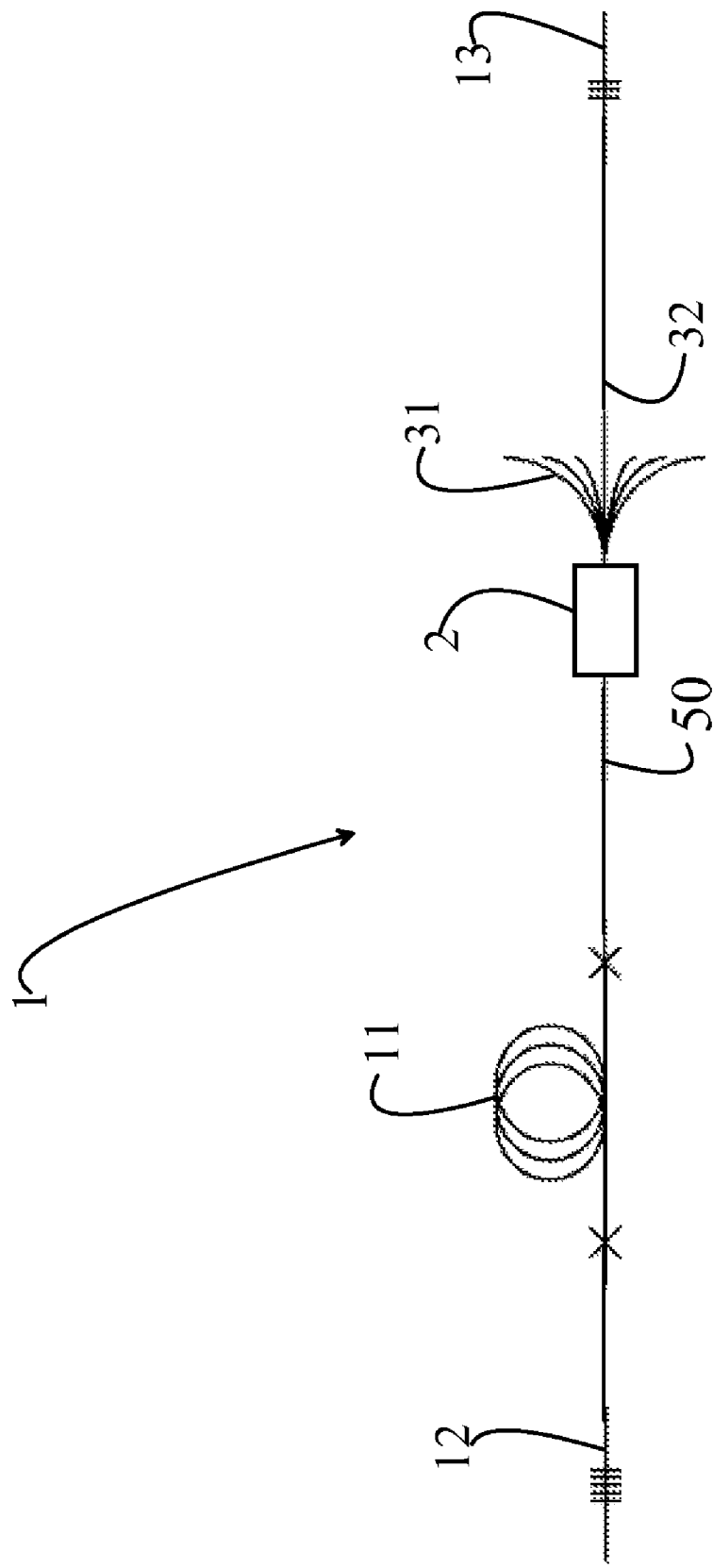
FIG. 2 shows schematically a second example of a fiber laser, which can be used in connection with the invention.

FIG. 2 describes another example of a fiber laser, the notations having the same meanings as in FIG. 1. The only difference to the resonator of FIG. 1 is that the pump-coupler 2 now resides inside the laser resonator 1, i.e. between the HR mirror 12 and LR mirror 13. In the configuration of FIG. 2 it is necessary for the pump coupler to have a low-loss signal feed-through, since it directly contributes to optical losses of the laser resonator 1.

Figure 3:
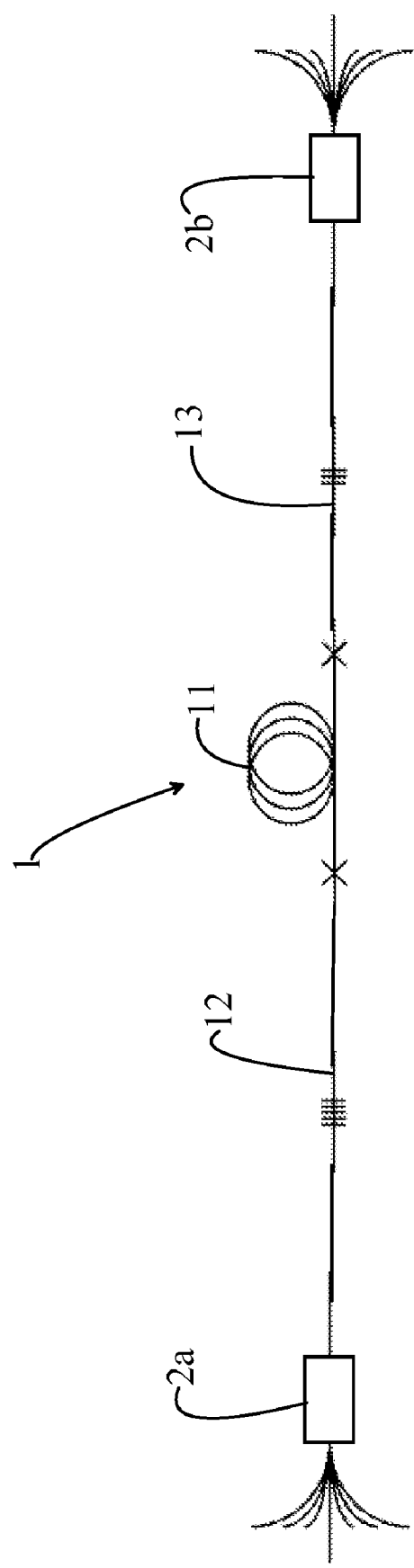
FIG. 3 shows schematically a third example of a fiber laser, which can be used in connection with the invention.

FIG. 3 describes yet another configuration of a fiber laser. In this example the fiber laser resonator is pumped with two pump couplers 2a and 2b from both ends of the laser resonator 1. It is evident that by extensions or modifications of the shown configurations other configurations can be constructed.

Figure 4:
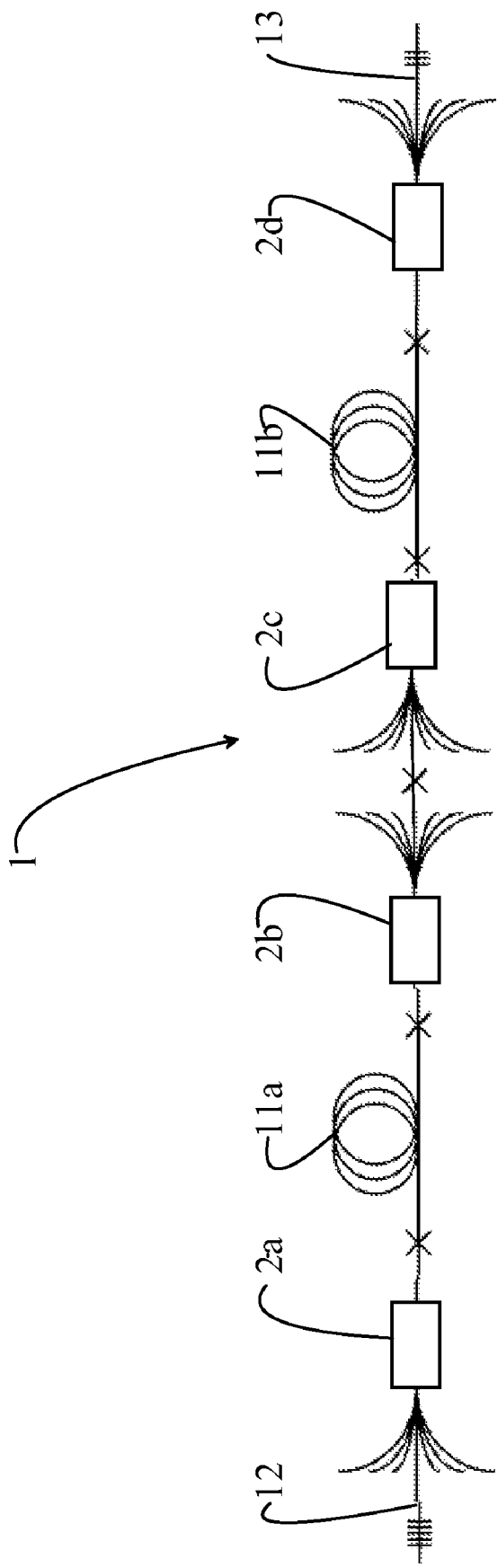
FIG. 4 shows schematically a fourth example of a fiber laser, which can be used in connection with the invention.

As the power coupling capacity of each pump coupler is limited, higher power fiber lasers can be constructed by cascading pump couplers with multiple sections of active fibers. FIG. 4 shows an example for a fiber laser that has four pump couplers 2a, 2b, 2c and 2d, connected to two active fiber sections 11a and 11b. The section 11a is pumped from both ends with pump couplers 2a and 2b, while the active fiber section 11b is pumped from both ends with pump couplers 2c and 2d. The HR mirror 12 and LR mirror 13 are attached to the signal feed-through fibers of pump couplers 2a and 2d, respectively.

The examples discussed above show that flexible and power scalable fiber lasers can be manufactured with low-loss pump couplers. The present invention describes a concept of a low-loss pump coupler and a method of manufacturing such pump couplers.

Figure 5A:
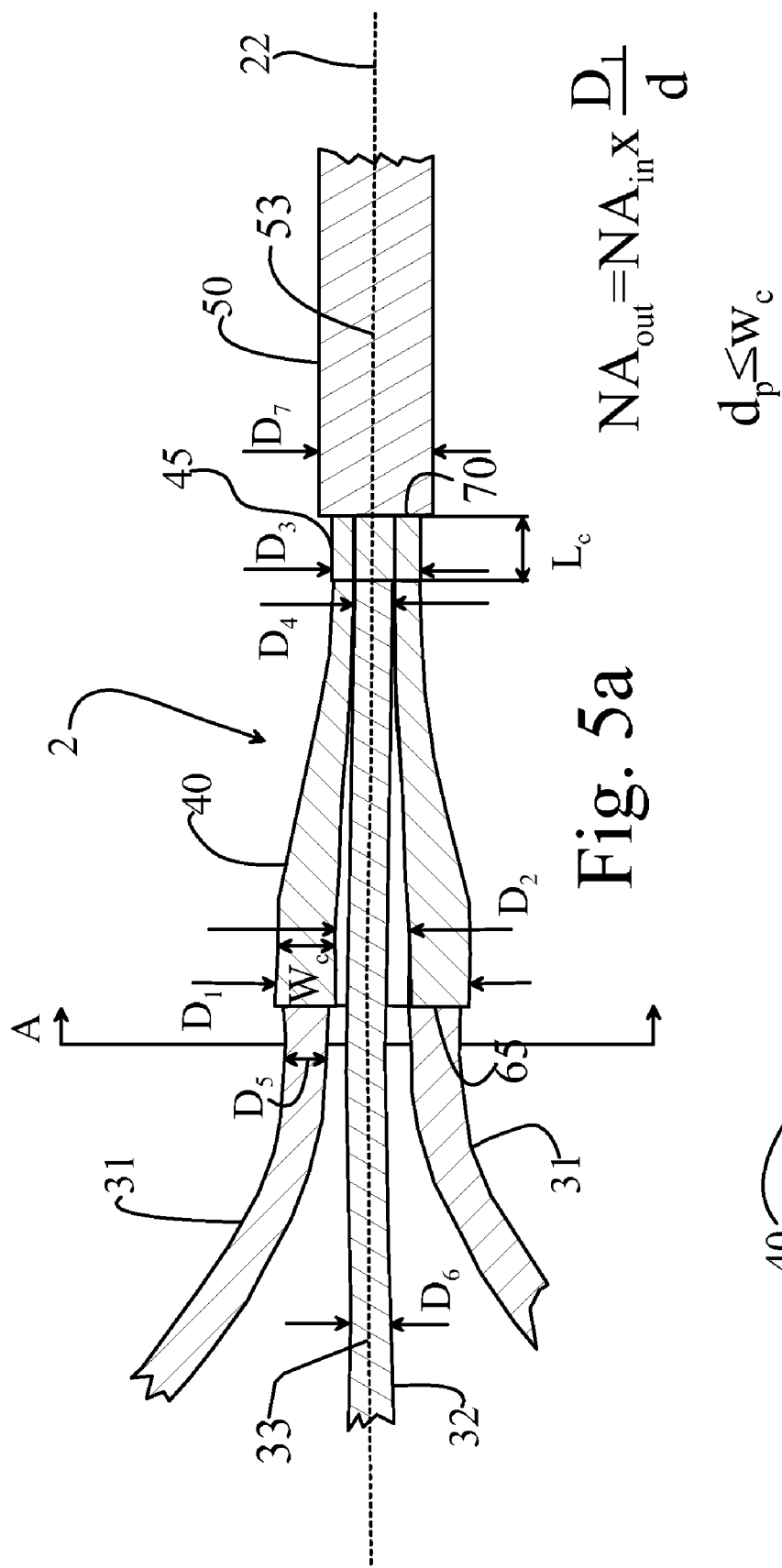
FIG. 5a shows as a partially cross sectioned side view of one pump coupler in accordance with the invention.

FIG. 5a shows one embodiment of the pump coupler 2. The coupler 2 consists of a number of pump fibers 31 arranged so that their optical axes are essentially parallel and their cleaved or polished ends lie essentially on the same plane, which is perpendicular to the optical axis 22 of the coupler 2. Note that only two pump fibers 31 are drawn in this cross-section, but it should be understood that the number of pump fibers can be larger, e.g. four or six. One restriction is that no pump fiber is located at the center of the bundle of pump fibers. The pump fibers 31 are then spliced to the cleaved or polished end of a tapered capillary tube 40 having the initial outer diameter of $D_1$ and inner diameter of $D_2$. In this embodiment the capillary taper 40 is formed by the well-known methods of glass drawing. Thus, both the outer and inner diameters of the capillary taper 40 change along the taper, but their ratio remains essentially constant. For low optical losses for the pump light in the coupler 2, the wall thickness $W_c$ of the capillary tube at the entrance end for the pump light is preferably equal to or larger than the diameter $D_5$ of the pump fibers. This ensures that all of the pump light from the pump fibers can be coupled to the glass portion of the capillary tube 40. The capillary taper 40 is preferably adiabatic, meaning that the lateral dimensions of the tube change slowly along its length so that the brightness of light traveling along the tapered capillary is essentially constant. Brightness here means the product of the wall thickness of the capillary and the numerical aperture (NA) of the light at any longitudinal location inside the taper. The capillary 40 has a wide first end 65 with an outer diameter $D_1$ and inner diameter $D_2$ and a narrow second end 70 with outer diameter $D_3$ and inner diameter $D_4$. At the center of the bundle of pump fibers and inside the central hole of the capillary taper 40 a signal feed-through fiber 32 is located. The diameter $D_6$ of the signal feed-through fiber 32 is slightly smaller than that of the inner hole $D_4$ of the tapered capillary 40. It should be clear that this restriction does not have to apply to the whole length of the signal feed-through fiber 32, but only to the portion that is fixed into the waist region of the capillary taper 40. The capillary tube 40 is collapsed onto the signal feed-through fiber 32 within region 45 of length $L_c$, thus making the capillary 40 and the signal feed-through fiber 32 to merge to form solid glass in the said region 45. The collapsed region 45 facilitates making a high quality cleave to the end of the taper. Cleaving of the taper is done with any of the methods used in fiber cleaving. The said cleaved end 70 of the taper 40 is spliced to an output signal fiber 50, preferably a double-clad fiber, so that the core 33 of the signal fiber 32 is essentially aligned with the core 53 of the output signal fiber 50. The core diameters and numerical apertures of the fibers 32 and 50 are preferably chosen to be essentially the same. This ensures that the laser radiation or signal can pass through the coupler 2 with minimal loss of power and beam quality. For good pump light transmission through the coupler 2, the waist diameter $D_3$ of the capillary taper 40 is chosen to be essentially equal to or smaller than the diameter $D_7$ of the output signal fiber 50.

Figure 5B:
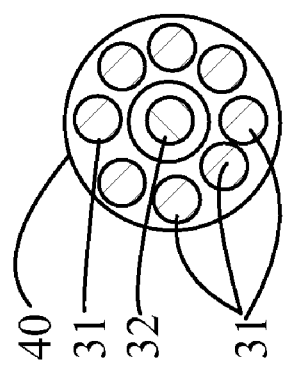

FIG. 5b shows a cross-section along the direction A of FIG. 5a showing totally eight pump fibers 31 around the signal fiber 32. The number of pump fibers 31 is typically from 6 to 8.

FIG. 9 shows another embodiment of the pump coupler 2 according to this invention. In this embodiment the capillary taper 40 is formed by chemically etching the outer surface of the capillary tube 40. Thus, only the outer diameter changes along the capillary taper 40, and $D_4 = D_2$. Other features in this embodiment are essentially similar to that of FIG. 5a.

The numerical aperture (NA) of a fiber is equal to, in a first approximation, the maximum angle the cone of radiation makes with the fiber axis when it exits the fiber into air. As a person skilled in the art can easily understand from the above description, the numerical aperture $NA_1$ of the pump light that is entering the capillary taper 40 from the pump fibers 31 will be increased, to a first approximation, by the capillary taper 40 to the value $NA_2$ according to the formula $NA_2 = NA_1 * D_1 / D_3$. Thus, the coupler 2 should be designed so that $NA_2$ does not exceed the maximum numerical aperture $NA_3$ of the pump waveguide of the output signal fiber 50. For a double clad output signal fiber the value for $NA_3$ is typically about 0.46, which is achieved with a low-index polymer coating. Hence, by observing the design rule $NA_2 \leq NA_3$ a coupler with good transmission from the pump fibers 31 into the output signal fiber 50 can be realized. This is the first task of the coupler 2. The second task is to transmit the laser radiation traveling inside the core of the signal feed-through fiber 32 and output signal fiber 50 through the coupler with minimal losses and degradation in the beam quality. This is achieved preferably by choosing the fibers 32 and 50 so that their core diameters and numerical apertures are essentially the same.

Figure 6:
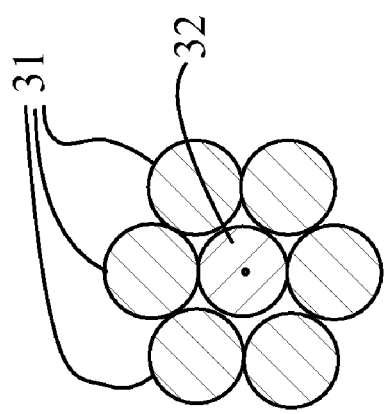
FIG. 6 shows a cross section of a typical optical fiber bundle with 6 pump fibers and a signal feed-through fiber, which can be used in method accordance with the invention.
Figure 7:
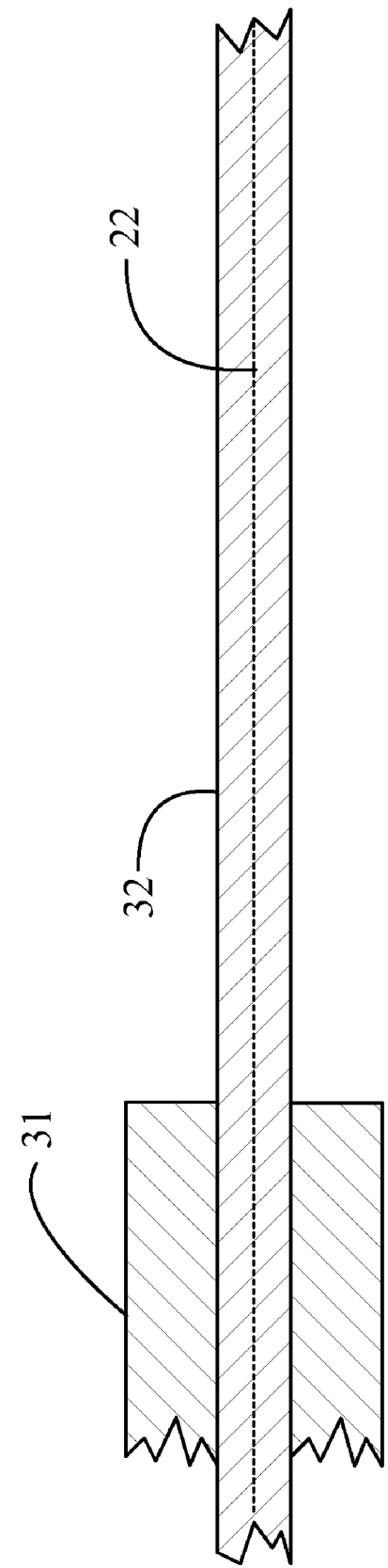
FIG. 7 shows as a side view the bundle of FIG. 6.

In accordance with FIG. 6 the first method in accordance with the invention begins with bundling the pump fibers 31 with the signal fiber 32. As can be seen from FIG. 7, the cleaved ends of the pump fibers 31 are aligned to end at the same level.

The waist to the capillary tube is formed by etching such that only the outer diameter of the capillary tube 40 is reduced and the inner diameter of the capillary remains the same.

This structure is further connected in accordance with FIG. 8 to the capillary tube 40 e.g. by splicing. The area 45 of the capillary tube 40 is then collapsed onto the signal fiber 32 from the waist.

In accordance with FIG. 9 the capillary tube 40 is cleaved from the collapsed portion 45 and another double clad output signal fiber 50 is spliced to the cleaved capillary tube 40 so that cores of signal fibers are aligned.

A second method in accordance with the invention is described in connection with FIGS. 10-12. In this solution both the inner diameter and the outer diameter of the capillary tube 40 are reduced at the taper.

In accordance with FIG. 10 a fiber bundle of the pump fibers 31 is formed around a bundling aid fiber 60, the diameter of which is about the same as the inner diameter of the capillary tube 40. The bundling aid fiber 60 does not extend as far as the pump fibers 31. The pump fibers 31 are spliced to the capillary tube 40 and the aid fiber 60 is removed and replaced by a signal feed-through fiber 32 typically with a smaller diameter than the aid fiber 60, at least at the portion that is pushed through the waist of the capillary tube 40. Aid fiber 60 may be also some other structure than fiber, e.g. a metallic wire. Therefore a term aid tool can also used in this connection. In a first implementation of fitting the signal feed-through fiber 32 to the capillary tube 40, the outer surface of the signal feed-through fiber 32 is etched chemically so that it just goes through the inner hole of diameter $D_4$ of the capillary tube 40. In another implementation of fitting the signal feed-through fiber 32 to the capillary tube 40, the fiber 32 is designed to have its original diameter slightly smaller than $D_4$.

As shown in FIG. 11 the capillary tube 40 is collapsed from the taper waist 45 onto the signal feed-through fiber 32.

In accordance with FIG. 12 the capillary tube is cleaved from the collapsed waist 45 portion and double clad output signal fiber 50 is spliced to the cleaved capillary tube 40.

What is claimed is:

1. A pump optical coupler comprising:
   an output optical fiber for propagating optical energy, the output optical fiber having an end;
   a pump optical fiber for propagating optical energy;
   a coupling structure for facilitating the coupling of optical energy between the pump fiber and the output optical fiber, the coupling structure comprising a tube having a taper and a wide end and a narrow end, the wide end of the tube comprising an annular end face, the narrow end of the tube comprising an annular end face;
   a feed-through optical fiber for propagating optical energy and feeding the optical energy through the coupling structure, the feed-through optical fiber comprising an end, a core and one or more claddings, the one or more claddings defining an outer surface of the feed-through optical fiber;
   wherein the pump optical fiber is connected to the end face of the wide end of the tube;
   wherein at least the narrow end of the tube is collapsed around the feed-through optical fiber at its end;
   wherein the annular end face of the narrow end of the tube and the end of the feed-through optical fiber are coupled to the end of the output optical fiber; and
   wherein at a location along a first length of the feed-through optical fiber, about which the tube is not collapsed, the feed-through optical fiber comprises a first outer diameter of the outer surface and wherein at another location along another length of the feed-through optical fiber, about which the tube is collapsed, the feed-through optical fiber has a second outer diameter of the outer surface that is substantially less than the first outer diameter of the outer surface.

2. The pump optical coupler of claim 1 wherein said feed-through optical fiber comprises a primary cladding disposed about the core and wherein said first and second outer diameters are outer diameters of said primary cladding.

3. The pump optical coupler of claim 1 wherein the outer diameter of the annular end face of the narrow end of the tube is essentially equal to or smaller than the diameter of the output optical fiber.

4. The pump optical coupler of claim 1 comprising a gap between the tube and the outer surface of the feed-through optical fiber.

5. The pump optical coupler of claim 1 wherein the feed through wherein the diameter of the core of the feed-through optical fiber does not taper through the coupling structure.

6. A pump optical coupler comprising:
   a pump optical fiber for propagating optical energy;
   an output optical fiber for propagating optical energy, the output optical fiber having an end;
   a coupling structure for facilitating the coupling of optical energy between the pump optical fiber and the output optical fiber, the coupling structure comprising a tube having a taper and a wide end and a narrow end, the wide end of the tube comprising an annular end face, the narrow end of the tube comprising an annular end face;
   a feed-through optical fiber for propagating optical energy and feeding the optical energy through the coupling structure, the feed-through optical fiber having an end, a core and one or more claddings disposed about the core, the one or more claddings defining an outer surface of the feed-through optical fiber;
   wherein the pump optical fiber is connected to the end face of the wide end of the tube;
   wherein at least the narrow end of the tube is collapsed around the feed-through optical fiber at its end;
   wherein the annular end face of the narrow end of the tube and the end of the feed-through optical fiber are coupled to the end of the output optical fiber; and
   wherein at a location along a first length of the feed-through optical fiber, about which the tube is not collapsed, the feed-through optical fiber has a first outer diameter of the outer surface and the core of the feed-through optical fiber has a first core diameter, and wherein at another location along another length of the feed-through optical fiber, about which the tube is collapsed, the feed-through optical fiber has a second outer diameter of the outer surface and the core of the feed-through optical fiber has a second core diameter, and wherein the ratio of the first outer diameter to the first core diameter is larger than the ratio of the second outer diameter to the second core diameter.

7. The pump optical coupler of claim 6 wherein at least the narrow end of the tube is collapsed around said feed-through optical fiber, with the limitation that the diameter of the outer surface of the feed-through optical fiber is less than the diameter of an inner hole of said narrow end and through which said feed-through optical fiber is passed prior to collapse of the narrow end about the feed-through optical fiber, and wherein this limitation is not applied to the whole length of the feed-through optical fiber.

8. The pump optical coupler of claim 6 wherein the outer diameter of the narrow end is essentially equal to or smaller than the diameter of the output optical fiber.

9. The pump optical coupler of claim 6 comprising a gap between the tube and the outer surface of the feed-through optical fiber.

10. The pump optical coupler of claim 6 wherein the diameter of the core of the feed-through optical fiber does not taper through the coupling structure.

11. A method for manufacturing a pump optical coupler, comprising:

providing an output optical fiber for propagating optical energy, the output optical fiber having an end;

providing a pump optical fiber for propagating optical energy;

providing a hollow coupling structure for facilitating the coupling of optical energy between the pump optical fiber and the output optical fiber;

providing a feed-through optical fiber for propagating optical energy and feeding the optical energy through the coupling structure, the feed-through optical fiber comprising a core and one or more claddings, the one or more claddings defining an outer surface of the feed-through optical fiber;

reducing the diameter of the outer surface of a first length of the feed-through optical fiber;

refraining from reducing the diameter of the outer surface of a second length of the feed-through optical fiber;

tapering the hollow coupling structure, the tapered coupling structure having a wide end and a narrowed section, the wide end having an end face;

connecting the pump optical fiber to the end face of the wide end of the coupling structure;

collapsing at least the narrowed section of the coupling structure onto the feed-through optical fiber at locations along the first length thereof after the diameter of its outer surface is reduced;

cleaving the collapsed narrowed section to form an end of the feed-through optical fiber and a narrow end of the tapered coupling structure collapsed around the end of the feed-through optical fiber, the narrow end having an annular end face; and then coupling the end of the output optical fiber to the annular end face of the narrow end of the tube and the end of the feed-through optical fiber.

12. The method of claim 11 wherein reducing the diameter of the outer surface of the first length of the feed-through optical fiber comprises etching.

13. The method of claim 11 wherein the feed-through optical fiber comprises a primary cladding disposed about a core and wherein reducing the diameter of the outer surface of the feed-through optical fiber comprises reducing the diameter of the primary cladding.

14. The method of claim 11 wherein tapering the hollow coupling structure comprises etching the outer surface of the coupling structure.

15. The method of claim 11 wherein tapering the hollow coupling structure comprises drawing the coupling structure.

16. The method of claim 11 wherein collapsing at least the narrowed section about the feed-through optical fiber includes refraining from collapsing another portion of the coupler structure about the feed-through optical fiber so as to leave a gap between the coupling structure and the outer surface of the feed-through optical fiber.

17. The method of claim 11 comprising refraining from tapering the core of the feed-through optical fiber through the coupling structure.

18. The pump optical coupler of claim 1, wherein the pump optical fiber is not tapered.

19. The pump optical coupler of claim 2, wherein the diameter of the core of the feed-through optical fiber is not tapered through the coupling structure.

20. The pump optical coupler of claim 6, wherein the pump optical fiber is not tapered.

21. The method of claim 11, wherein the diameter of the core of the feed-through optical fiber is not tapered through the coupling structure.

22. The method of claim 11, wherein the pump optical fiber is not tapered.

* * * * *